(12) United States Patent
Torr

(10) Patent No.: US 6,735,877 B2
(45) Date of Patent: May 18, 2004

(54) ANGLE MEASURING DEVICE

(75) Inventor: Alan Torr, Kent (GB)

(73) Assignee: Dr. Johannes Heidenhain GmbH, Traunreut (DE)

(*) Notice: Subject to any disclaimer, the term of this patent is extended or adjusted under 35 U.S.C. 154(b) by 0 days.

(21) Appl. No.: 09/852,974

(22) Filed: May 10, 2001

(65) Prior Publication Data

US 2002/0002777 A1 Jan. 10, 2002

(30) Foreign Application Priority Data

May 10, 2000 (DE) .......................... 100 22 555

(51) Int. Cl.[7] ................................ G01B 7/30
(52) U.S. Cl. ..................... 33/1 PT; 33/1 N; 73/116
(58) Field of Search .................. 33/1 PT, 1 N, 33/706, 707, 708, 709, 534; 73/116

(56) References Cited

U.S. PATENT DOCUMENTS

| | | | | |
|---|---|---|---|---|
| 4,369,578 A | * | 1/1983 | Ernst ........................... | 33/1 PT |
| 4,386,270 A | * | 5/1983 | Ezekiel .................. | 250/231 SE |
| 4,495,700 A | * | 1/1985 | Ernst ........................... | 33/1 PT |
| 4,660,288 A | * | 4/1987 | Dangschat .................. | 33/1 PT |
| 4,663,851 A | * | 5/1987 | Feichtinger .................. | 33/1 PT |
| 4,942,295 A | * | 7/1990 | Brunner et al. ......... | 250/231.13 |
| 5,744,706 A | * | 4/1998 | Siraky .......................... | 33/1 PT |
| 5,758,427 A | | 6/1998 | Feichtinger et al. | |
| 5,771,594 A | | 6/1998 | Feichtinger et al. | |
| 5,808,185 A | | 9/1998 | Siraky | |
| 5,981,940 A | | 11/1999 | Setbacken et al. | |
| 6,002,126 A | * | 12/1999 | Feichtinger .................. | 33/707 |
| 6,124,654 A | | 9/2000 | Siraky | |
| 6,601,307 B2 | * | 8/2003 | Meyer ......................... | 33/1 PT |
| 6,642,508 B2 | * | 11/2003 | Setbacken et al. ..... | 250/231.13 |
| 2002/0112357 A1 | * | 8/2002 | Lahr ........................... | 33/1 PT |
| 2002/0148123 A1 | * | 10/2002 | Mitterreiter et al. ......... | 33/1 PT |

FOREIGN PATENT DOCUMENTS

| | | |
|---|---|---|
| DE | 89 15 109 | 4/1990 |
| DE | 195 21 845 | 12/1996 |
| DE | 196 29 585 | 3/1997 |
| DE | 196 17 585 | 6/1997 |
| DE | 197 42 800 | 9/1999 |
| EP | 0 762 081 | 3/1997 |

* cited by examiner

Primary Examiner—Diego Gutierrez
Assistant Examiner—Mirellys Jagan
(74) Attorney, Agent, or Firm—Brinks Hofer Gilson & Lione

(57) ABSTRACT

An angle measuring device for measuring an angular position of a stationary object with respect to an object which is rotatable around an axis of rotation, that includes a rotor which is connected to the rotatable object which rotates about the axis of rotation and a stator that includes a scanning unit for scanning a graduation, which moves in relation to the scanning unit. A coupler is fastened to the stationary object or stator so as to seat the stator on the stationary object that has a contact face which extends transversely with respect to the axis of rotation. The coupler has a contact face that extends transversely with respect to the axis of rotation and engages the clamping face of the stationary object or stator so that a clamping force is generated so as to fasten the coupler to the stationary object and wherein the coupler is fixed against relative rotation, but is radially and/or axially elastic.

22 Claims, 7 Drawing Sheets

ANGLE MEASURING DEVICE

Applicant claims, under 35 U.S.C. § 119, the benefit of priority of the filing date of May 10, 2000 of a German patent application, copy attached, Ser. Number 100 22 555.1, filed on the aforementioned date, the entire contents of which is incorporated herein by reference.

BACKGROUND OF THE INVENTION

1. Field of the Invention

The present invention relates to an angle measuring device for measuring the angular position of a stationary object with respect to an object, which is rotatable around an axis of rotation. The invention furthermore relates to a method for mounting a stator of an angle measuring device, having a rotor rotating around an angle of rotation, on a stationary object.

2. Discussion of Related Art

Angle measuring devices of this type are used for determining the angular position, the angular velocity or other angle-dependent values of a rotatable object and for making them available for purposes of display, control of a machine tool, regulation or other evaluations.

In order to compensate for alignment errors when connecting the rotor of the angular measuring device to the rotatable object, as well as axial and radial deviations of the rotatable object, a coupler is arranged between the stator of the angular measuring device and the stationary object, which connects the stator of the angular measuring device with the stationary object in a manner fixed against relative twisting, but in an axially and/or radially flexible manner.

Angle measuring devices of this type are known, for example, from DE 196 17 585 C1 and DE 195 21 845 C2. DE 196 17 585 C1 corresponds to U.S. Pat. No. 5,808,185, the entire contents of which are incorporated herein by reference.

In connection with the angle measuring device in accordance with DE 196 29 585 A1 it was noted that it is advantageous to arrange the coupler between the stator and the stationary object in the area of the seating of the rotor, i.e. in the vicinity of the place of coupling of the rotor. The work space available in this area is very limited, so that problems regarding the ability to reach the device for radial clamping of the coupler and to actuate it can arise in actual use. Note that DE 196 29 585 C1 corresponds to U.S. Pat. No. 5,758,427, the entire contents of which are incorporated herein by reference.

OBJECTS AND SUMMARY OF THE INVENTION

It is therefore an object of the present invention to disclose an angle measuring device in which the coupler can be clamped without an actuating element having to be accessible from the outside.

This object is attained by an angle measuring device for measuring an angular position of a stationary object with respect to an object which is rotatable around an axis of rotation, that includes a rotor which is connected to the rotatable object which rotates about the axis of rotation and a stator that includes a scanning unit for scanning a graduation, which moves in relation to the scanning unit. A coupler is fastened to the stationary object or stator so as to seat the stator on a stationary object that has a contact face, which extends transversely with respect to the axis of rotation. The coupler has a contact face that extends transversely with respect to the axis of rotation and engages the clamping face of the stationary object or stator so that a clamping force is generated so as to fasten the coupler to the stationary object and wherein the coupler is fixed against relative rotation, but is radially and/or axially elastic.

It is therefore a further object of the present invention to disclose a method for mounting a stator of an angle measuring device on a stationary object, wherein as few as possible mounting steps are required and which can also be performed inside a limited work space.

This object is attained by a method for mounting a stator of an angle measuring device, having a rotor rotating around an axis of rotation, on a stationary object, by attaching a radially and/or axially compensating coupler to the stator of the angle measuring device and axially moving the angle measuring device toward the stationary object, wherein a contact face of the coupler comes into contact with a contact face of the stationary object. Supporting the contact face of the coupler on the contact face of the stationary object, wherein by the axially moving the angle measuring device toward the stationary object the coupler is clamped to the stationary object in a manner fixed against relative rotation.

The advantages which can be achieved by the present invention include in particular the coupler can be installed in the vicinity of the seating of the rotor of the angle measuring device and that, regardless of the restricted installation conditions, the coupler can be fastened on the stationary object in a manner which is solid and fixed against relative rotation. The space of the coupler need not be accessible from the outside for clamping with the stationary object. A solid and space-saving mounting is possible.

Further advantages as well as details of the present invention will become apparent from the ensuing description of an exemplary embodiment in conjunction with the accompanying drawing.

DETAILED DESCRIPTION OF THE PREFERRED EMBODIMENTS

Figure 1:
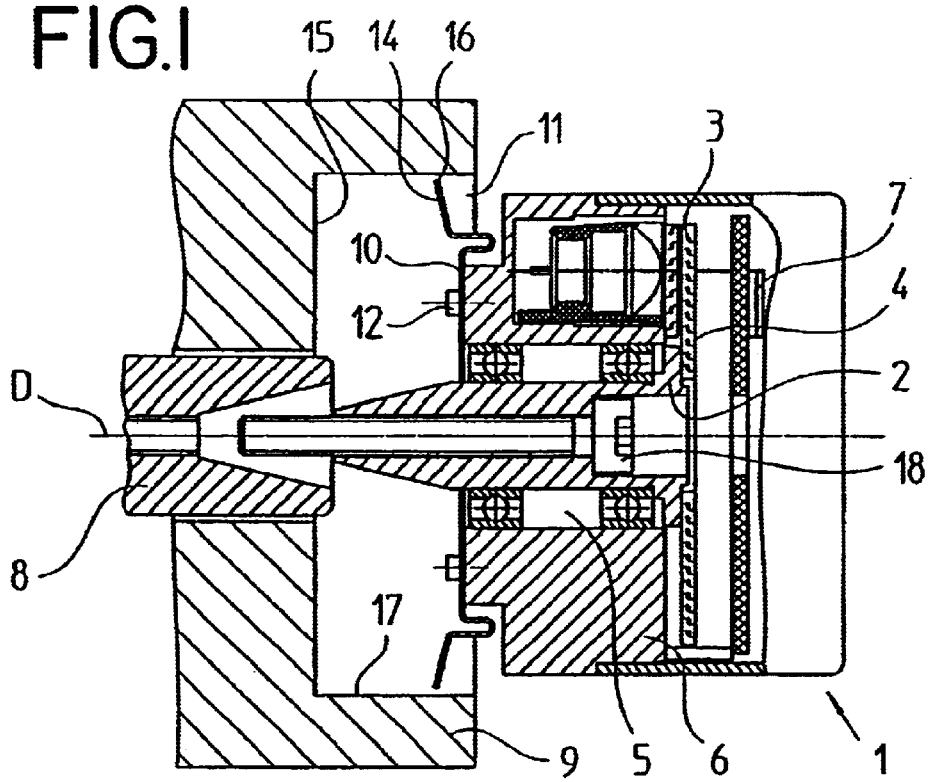
FIG. 1 is a cross-sectional view of an embodiment of an angle measuring device according to the present invention in a mounting space in a first mounting position.

A first exemplary embodiment of the present invention is represented in FIGS. 1 to 4. The angle measuring device 1 includes a rotor 2, to which a graduated disk 3 with a graduation 4 is attached. The rotor 2 is seated, rotatable round the axis of rotation D, in the stator 6 of the angle measuring device 1 by means of a bearing 5. The angular position of the rotor 2 in relation to the stator 6 is measured in that the graduation 4 is scanned in a known manner by a scanning unit 7 attached to the stator 6. Here, the graduation 4 can be a pattern in the shape of an incremental or coded graduation, which can be scanned optically, magnetically, capacitively or inductively.

To measure the angular position of an object 8, which is rotatable around the axis of rotation D, in relation to a stationary object 9, the rotor 2 must be connected, fixed against relative rotation, with the stationary object 9. In the example shown, the rotatable object is the shaft 8 of an electric motor, and the stationary object is the motor housing 9.

To compensate alignment errors between the rotor 2 and the shaft 8, as well as to compensate tumbling movements, as well as axial displacement of the shaft 8, the stator 6 is mounted on the motor housing 9 by a coupler 10, which is fixed against twisting, but provides radial and/or axial compensation. The coupler 10 is advantageously fastened on the stator 6 in the area of the bearing 5 of the rotor, and therefore on the end of the angle measuring device 1 on the rotor side.

Before the angle measuring device 1 is introduced into the mounting space 11 defined by the motor housing 9, one end of the coupler 10 is rigidly fastened on the stator 6 of the angle measuring device 1. This can be accomplished by screws 12, which engage bores 13 (see FIG. 3) formed in the coupler 10. Fastening can also be provided by riveting, gluing or welding.

Thereafter the angle measuring device 1 with the coupler 10 is pushed into the mounting space 11 and is guided axially to the motor housing 9. This first mounting position is represented in FIG. 1.

Figure 2:
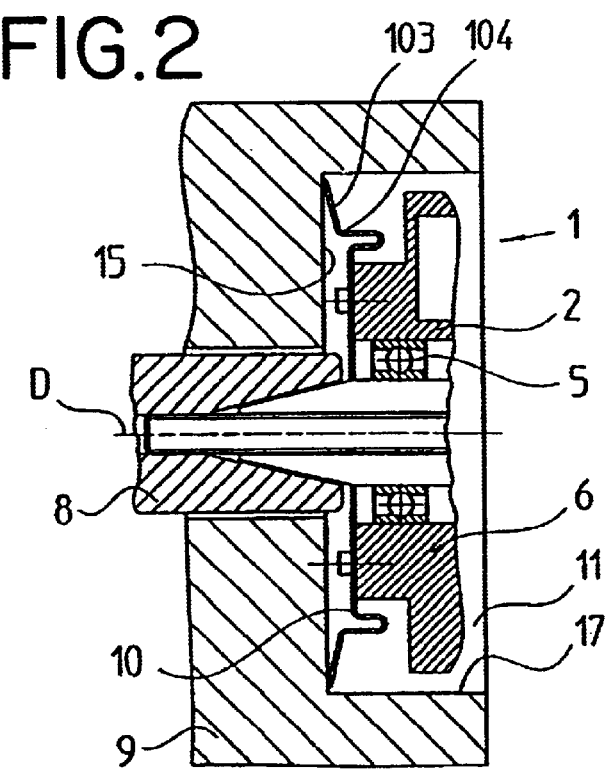
FIG. 2 is a cross-sectional view of the angle measuring device in accordance with FIG. 1 in a second mounting position.

In the course of this axial approach, the coupler 10 is pushed with an axially effective contact face 14 against a contact face 15 of the motor housing 9, which extends transversely with respect to the axis of rotation D. This second mounting position is represented in FIG. 2.

Figure 3:
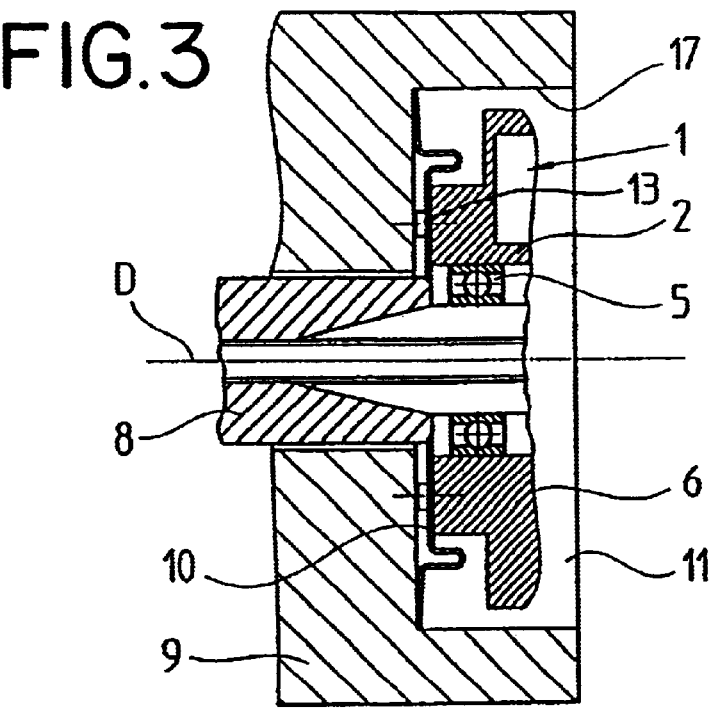
FIG. 3 shows a cross-sectional view of the angle measuring device in accordance with FIG. 1 in the installed state.

As the angle measuring device 1 with the coupler 10 is axially moved in further, the contact face 14 of the coupler 10 is supported on the axially effective contact face 15 of the motor housing 9 and slides in a radial direction, until a further contact face 16 of the coupler 10 pushes against a circumferential face 17 of the motor housing 9, on which the coupler 10 is automatically radially clamped in a manner fixed against relative rotation by being spread radially on the circumferential face 17. The clamping force required for radial clamping is provided by the cooperation of the two contact faces 14 and 15, in that an axial pressure force acting on the coupler 10 is converted into a radially acting clamping force. An axial screw 18, which connects the rotor 2, fixed against relative rotation, with the shaft 8, is provided for introducing and maintaining the axial pushing force. The screw 8 is axially introduced from the accessible back of the angle measuring device 1 through a bore in the rotor 2 and screwed into the shaft 8 of the motor, and its screw head is axially supported on the rotor 2 and in this way pushes the conical end of the rotor 2 into the cone of the shaft 8. The angle measuring device 1 is represented in FIG. 3 in the mounted state.

Figure 4:
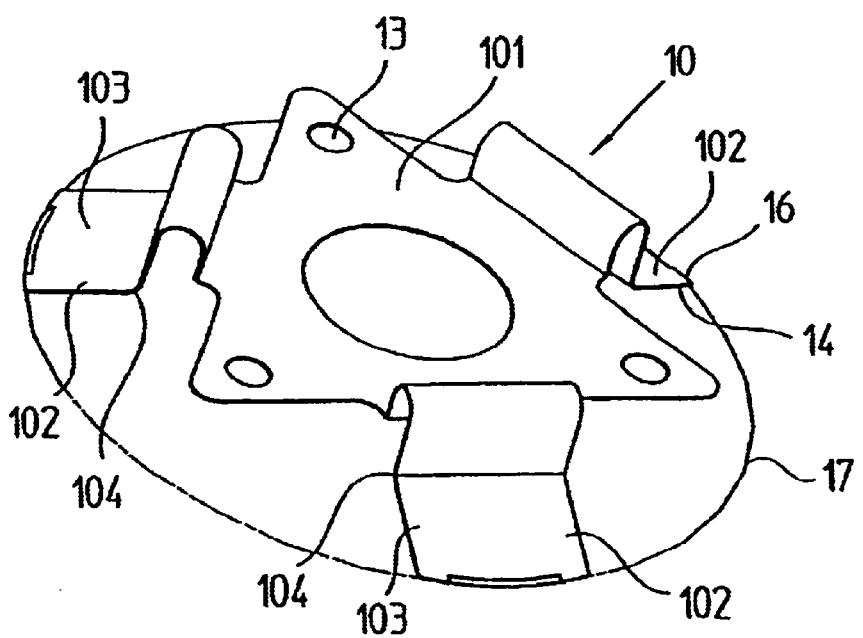
FIG. 4 shows a perspective view of an embodiment of a coupler to be used with the angle measuring device in accordance with FIGS. 1 to 3 according to the present invention.

The coupler 10 is represented in a perspective plan view in FIG. 4. The circular circumferential face 17 (tube-shaped barrel) on which the coupler 10 is radially spread is shown only schematically as a ring. Advantageously the coupler 10 is produced as one piece from spring steel (punched and bent part) and includes a base 101 having the bores 13 for fastening on the stator 6. Several—for example three—tongues 102 have been formed on the base 101, which have the contact faces 14 and 16. The tongues 102 are bent in a wave shape between the base 101 and the contact faces 14 in such a way that an axial and radial compensating movement between the base 101 and the contact faces 14 is made possible. The tongues are furthermore bent in such a way that the axial force, which is exerted by the stator 6 on the base 101, and further via the tongues 102, is converted into a radial force in cooperation with the contact face 15. If, as represented, the contact face 15 extends vertically with respect to the axis of rotation D, and if a radially outward acting clamping force is intended for fastening the coupler 10 on the motor housing 9, each tongue 102 must have an oblique, outward pointing section 103, which is connected via a joint 104 with the remaining portion of the coupler 10.

If a radially inward acting clamping force is to be used for fastening the coupler 10 on the motor housing 9, each tongue 102 must have an oblique, inward pointing section. For redirecting the axial force it is also possible that the contact face 15 is obliquely designed, i.e. inclined by other than 90° with respect to the axis of rotation D.

Figure 5:
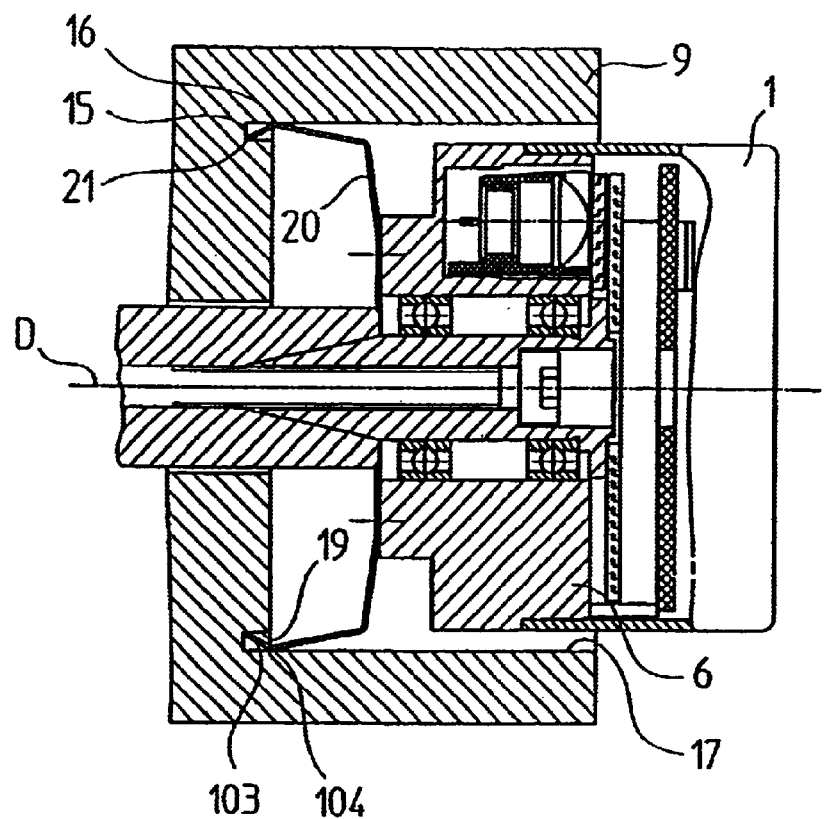
FIG. 5 shows a cross-sectional view of a second exemplary embodiment of an angle measuring device with a coupler according to the present invention.
Figure 6:
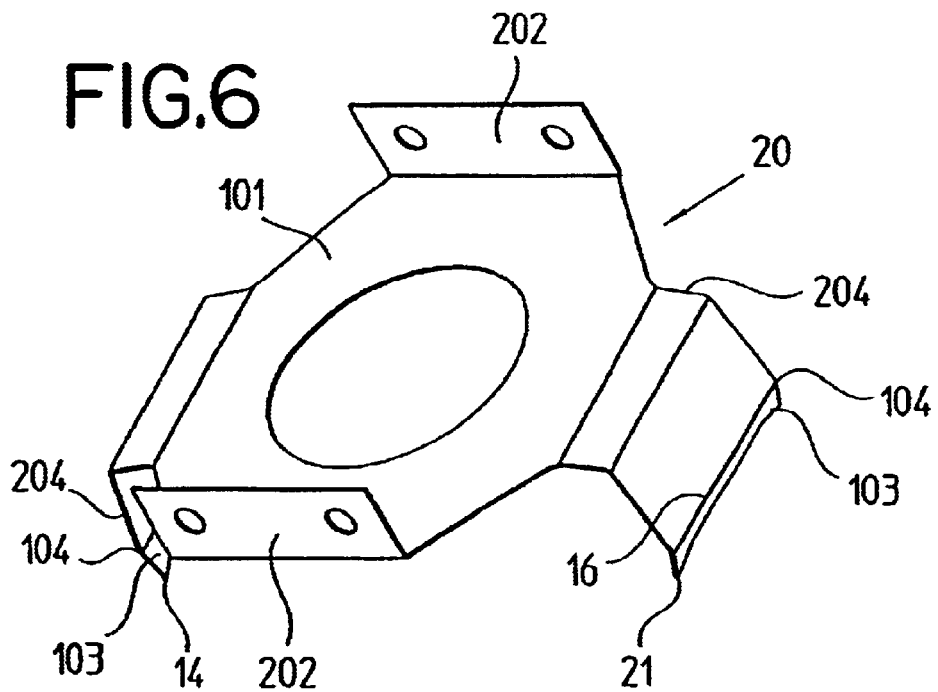
FIG. 6 shows a perspective view of a second embodiment of a coupler to be used with the angle measuring device in accordance with FIG. 5.

A further angle measuring device with a coupler 20 for fastening the stator 6 on the motor housing 9 is represented in FIGS. 5 and 6. The coupler 20 is designed similarly to the coupler disclosed in DE 89 15 109.7 U1 and includes a base 101 with two tongues 202, which are bent at right angles with respect to the base 101 and extend parallel with each other and are screwed to the stator 6. Two further tongues 204, which extend parallel with each other at least to a large degree, are formed on the base 101, wherein these further tongues 204 extend at least to a large degree at right angles with respect to the base 101, as well as at right angles with respect to the first tongues 202. The further tongues 204 are designed for being clamped, fixed against relative twisting, to the motor housing 9. This coupler 20 is also advantageously designed as one piece in the form of a stamped and bent part made of spring steel. The respectively parallel extending tongues 202 and 204 constitute a parallel guidance in the radial direction.

The ends of the tongues 204 can be designed corresponding to the tongues 102 shown in FIG. 4 and can be clamped against the radial circumferential face 17. In accordance with FIG. 5, for strengthening the clamping an inner circumferential face 19 can be additionally provided in the motor housing 9, on which the tongues 204 are additionally radially supported. In the course of moving the coupler 20 toward the axially acting contact face 15 of the motor housing 9, the oblique section 103 is pivoted around the joint 104, because of which an inner contact face 21 of the coupler 20 comes into contact with the inner circumferential face 19 of the motor housing 9, and an outer contact face 16 of the coupler 20 comes into contact with the outer circumferential face 17 of the motor housing 9, and the ends of the tongues 204 of the coupler 20 are spread, fixed against relative twisting, between the two circumferential faces 17 and 19.

Figure 7:
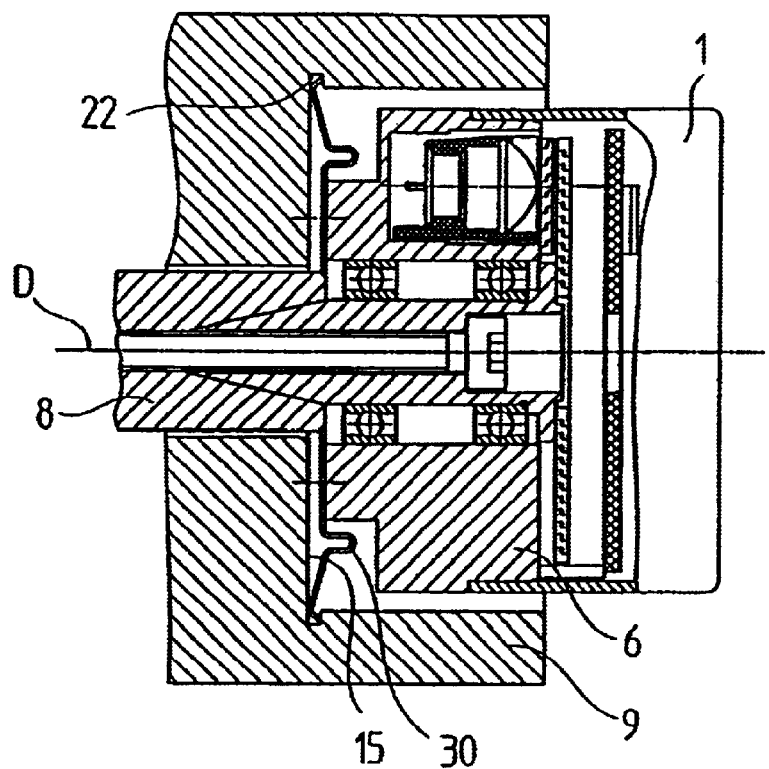
FIG. 7 shows a cross-sectional view of a third exemplary embodiment of an angle measuring device with a coupler according to the present invention.
Figure 8:
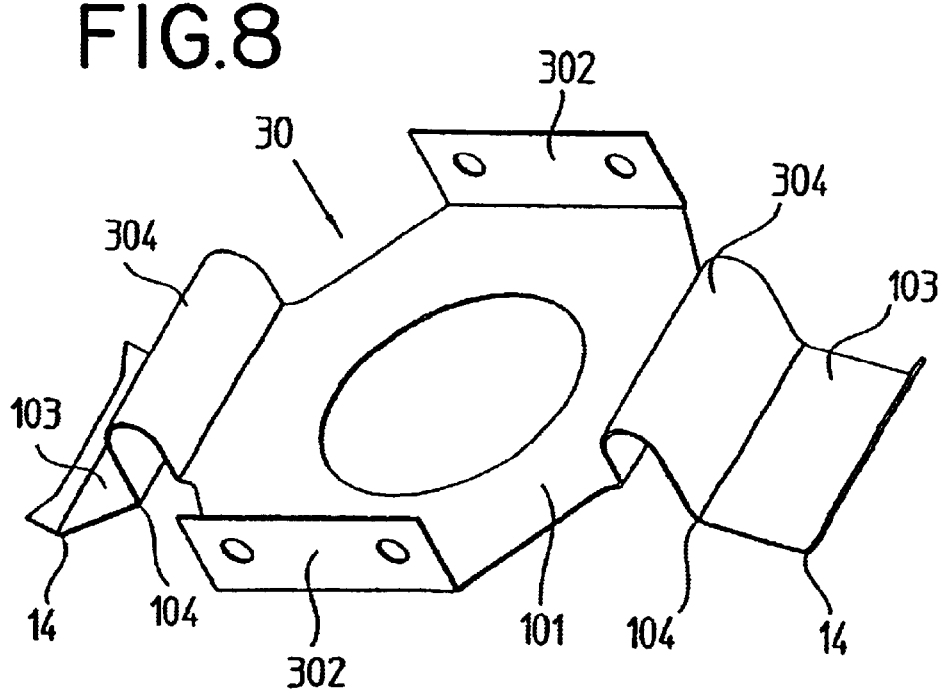
FIG. 8 shows a perspective view of a third embodiment of a coupler to be used with the angle measuring device in accordance with FIG. 7.

A third exemplary embodiment is represented in FIGS. 7 and 8. The coupler 30 again includes a base 101, on which two diametrically oppositely located tongues 302, which extend parallel with each other, are formed and screwed to the stator 6. Arranged offset by 90° with respect to the first tongues 302, two further diametrically oppositely located tongues 304 are formed on the base 101, which are designed for being clamped, fixed against relative twisting, on the motor housing 9. After the contact face 14 of the coupling 30 pushes against the contact face 15 of the motor housing 9, the joint 104 causes the section 103 to be radially outwardly displaced, and the bent end is axially clamped in a manner fixed against relative twisting in the gap 22 formed in the motor housing 9 by being axially spread, in that the bent end is tipped against the contact face 15.

Figure 9:
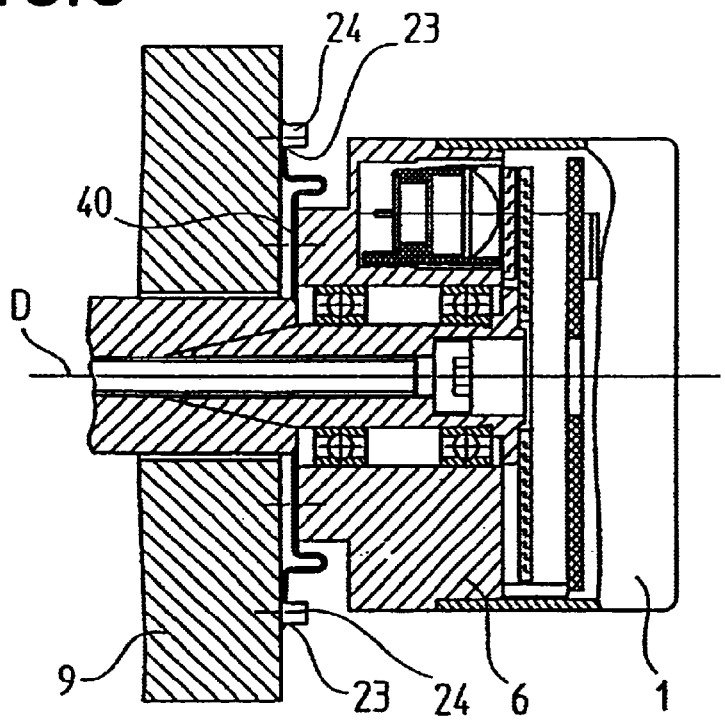
FIG. 9 shows a cross-sectional view of a fourth exemplary embodiment of an angle measuring device with a coupler according to the present invention.
Figure 10:
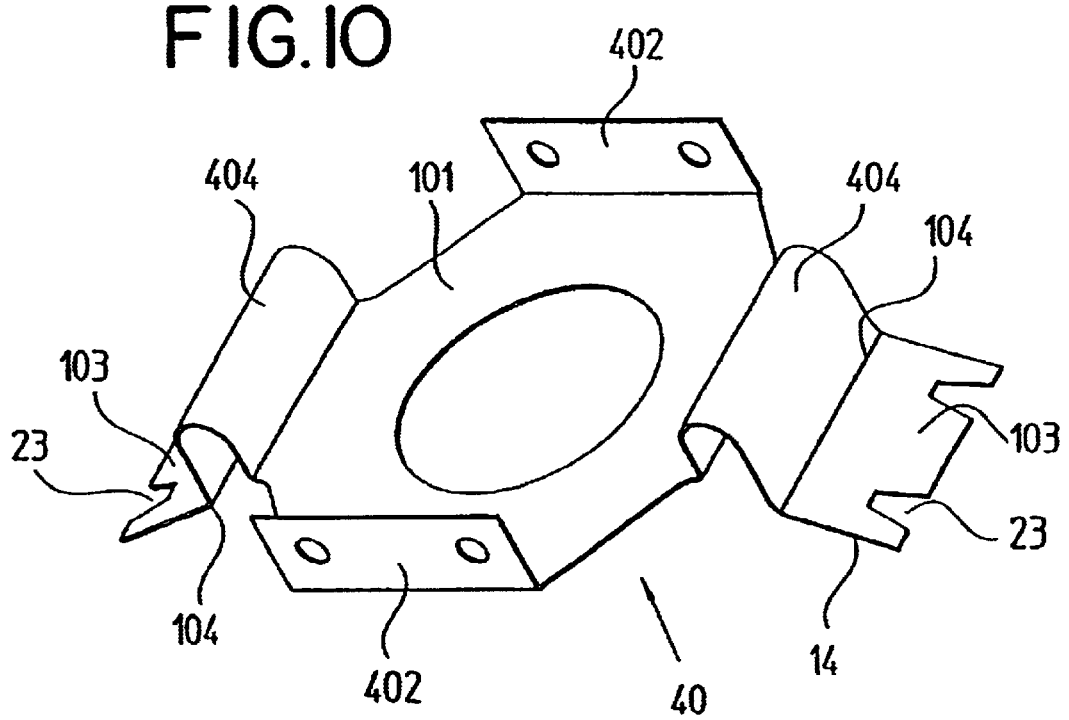
FIG. 10 shows a perspective view of a fourth embodiment of a coupler to be used with the angle measuring device in accordance with FIG. 9.

A fourth example of an angle measuring device 1 with a coupler 40 is represented in FIGS. 9 and 10. The coupler 40 corresponds to the embodiment in accordance with FIGS. 7 and 8 with the difference, that the two tongues 404 are additionally connected, fixed against relative twisting, with the motor housing 9 by an interlocking connection. To this end, at least one cutout 23 is provided in each one of the tongues 404, which is engaged by a protrusion in the form of a pin 24 of the motor housing 9. The tongues 404 are supported in a radially clamping manner on the pins 24. The cutouts 23 are conically formed and taper radially inward, so that the edges of the cutout 23 are pushed, free of play, against the pins 24 because of the introduced clamping force.

The interlocking connection between the tongues 404 and the motor housing 9 acts as a solid fixation against relative rotation. In place of the pins 24, differently designed elevations of the motor housing 9 can provide an interlocking fixation against relative rotation with the tongues 404. The interlocking connection can also be provided by depressions in the motor housing 9, which are engaged by areas of the tongues 404.

Figure 11:
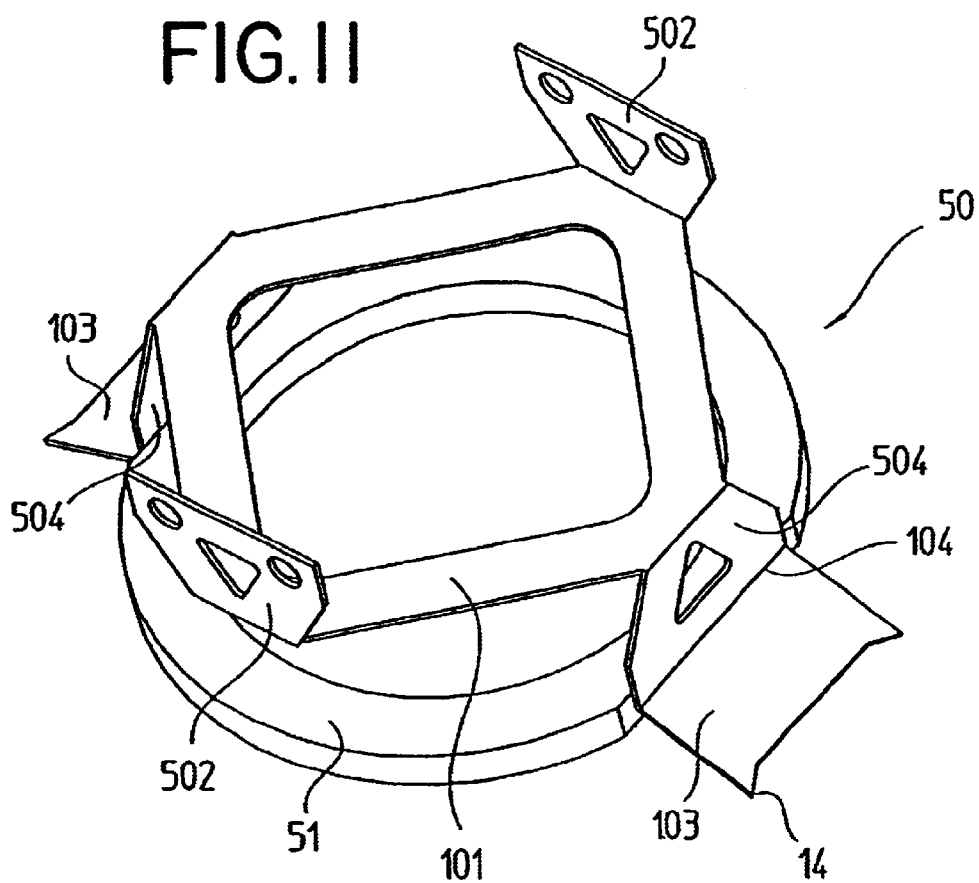
FIG. 11 shows a perspective view of a fifth embodiment of a coupler according to the present invention.

A fifth example of an angular measuring device is explained by a coupler 50, which is schematically represented in FIG. 11. In principle, this coupler 50 corresponds to the embodiment in accordance with FIGS. 5 and 6 with the difference that the base 101 and the respectively diametrically oppositely located tongues 502 and 504 are designed in a lattice shape in accordance with EP 0 762 081 A1. Furthermore, the tongues 504 used for radial compensation are detached from the sections 103 used for clamping by a solid intermediate ring 51. The radial spreading forces required for the radial clamping of the coupler 50 on the motor housing 9 therefore only act between the motor housing 9 and the intermediate ring 51, so that the compensation coupler 50 is relieved of radial clamping forces. Note that EP 0 762 081 A1 corresponds to U.S. Pat. No. 5,771,594, the entire contents of which are incorporated herein by reference.

The tongues 102, 202, 302, 402, 502, as well as 204, 304, 404, 504 are advantageously radially deflectable leaf spring elements.

Elements having the same functions have been provided with the same reference numerals in all drawing figures. The explanations regarding one of these elements in an exemplary embodiment also apply to the other exemplary embodiments.

The automatic clamping of the coupler 10, 20, 30, 40, 50 on the motor housing 9 can be increased in all exemplary embodiments in that the clamping faces 16, 17, 19, 21 have surfaces which increase frictional adhesion, in particular roughened surfaces or coatings increasing adhesion.

Figure 12:
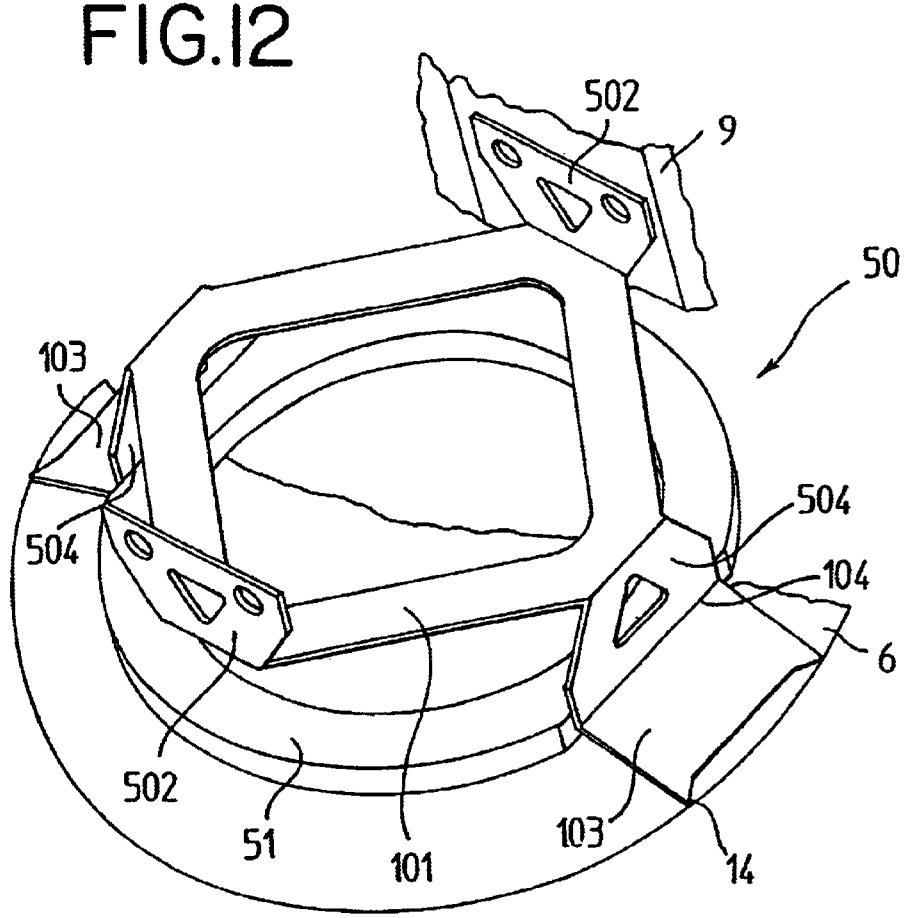
FIG. 12 shows a perspective view of a sixth embodiment of a coupler according to the present invention.

The explained clamping of the coupler 10, 20, 30, 40, 50 can also be employed alternatively or additionally between the coupler and the stator of the angle measuring device. An example of such clamping is schematically shown in FIG. 12 wherein elements 6 and 9 of FIG. 11 are interchanged. FIG. 12 schematically shows the clamping force being applied between the coupling 50 and the stator 6 of the angle measuring device in that the sections 103 radially spread away from the stator 6.

The foregoing description is provided to illustrate the invention, and is not to be construed as a limitation. Numerous additions, substitutions and other changes can be made to the invention without departing from its scope as set forth in the appended claims.

I claim:

1. An angle measuring device for measuring an angular position of a stationary object with respect to an object which is rotatable around an axis of rotation, comprising:
   a rotor comprising a graduation, which is connected to said rotatable object, which rotates about an axis of rotation;
   a stator comprising a scanning unit for scanning said graduation, which rotates in relation to said scanning unit;
   a coupler fastened to said stator so as to seat said stator on said stationary object that comprises a contact face which extends transversely with respect to said axis of rotation, wherein said coupler comprises a contact face that extends transversely with respect to said axis of rotation and engages said contact face of said stationary object so that a clamping force is generated so as to fasten said coupler to said stationary object and wherein said coupler is fixed against relative rotation, but is radially and/or axially elastic.

2. The angle measuring device of claim 1, wherein said clamping force is generated by axial displacement of said stator.

3. A The angular measuring device in accordance with claim 1, wherein said coupler comprises:
   a base that is fastened on said stator; and
   a plurality of tongues formed on said base that clamp said coupler to said stationary object.

4. The angular measuring device in accordance with claim 3, wherein one of said plurality of tongues comprises a wave-shaped bend positioned between said base and a clamping place, where said one of said plurality of tongues clamps said coupler to said stationary object.

5. The angular measuring device in accordance with claim 1, wherein said coupler is clamped against a circumferential face of said stationary object.

6. The angular measuring device in accordance with claim 5, wherein said coupler comprises:
   a base that is fastened on said stator; and
   a plurality of tongues formed on said base that clamp said coupler to said stationary object.

7. The angular measuring device in accordance with claim 5, wherein said coupler comprises:
   two diametrically oppositely located tongues that are fastened to said stator; and
   two further diametrically oppositely located tongues, which are offset by 90° with respect to said two diametrically oppositely located tongues that are fastened to said stator, and wherein clamping takes place between said two further diametrically oppositely located tongues and said stationary object.

8. The angular measuring device in accordance with claim 1, wherein said coupler comprises:
   two diametrically oppositely located tongues that are fastened to said stator; and
   two further diametrically oppositely located tongues, which are offset by 90° with respect to said two diametrically oppositely located tongues that are fastened to said stator, and wherein clamping takes place between said two further diametrically oppositely located tongues and said stationary object.

9. The angular measuring device in accordance with claim 8, wherein one of said two further diametrically oppositely located tongues comprises a section that is fastened on a ring.

10. The angular measuring device in accordance with claim 9, wherein said contact face is fastened on said ring.

11. An angle measuring device for measuring an angular position of a stationary object with respect to an object which is rotatable around an axis of rotation, comprising:
   a rotor comprising a graduation, which is connected to said rotatable object, which rotates about an axis of rotation;
   a stator comprising a scanning unit for scanning said graduation, which moves in relation to said scanning unit;
   a coupler fastened to said stator by being clamped against a circumferential face of said stationary object so as to seat said stator on said stationary object that comprises a contact face which extends transversely with respect to said axis of rotation, wherein said coupler comprises a contact face that extends transversely with respect to said axis of rotation and engages said contact face of said stationary object so that a clamping force is generated so as to fasten said coupler to said stationary object and wherein said coupler is fixed against relative rotation, but is radially and/or axially elastic, wherein said coupler comprises an area which is radially spread against an inner face and circumferential face of said stationary object.

12. The angular measuring device in accordance with claim 11, wherein said coupler comprises:
   a base that is fastened on said stator; and
   a plurality of tongues formed on said base that clamp said coupler to said stationary object.

13. The angular measuring device in accordance with claim 11, wherein said coupler comprises:
   two diametrically oppositely located tongues that are fastened to said stator; and
   two further diametrically oppositely located tongues, which are offset by 90° with respect to said two diametrically oppositely located tongues that are fastened to said stator, and wherein clamping takes place between said two further diametrically oppositely located tongues and said stationary object.

14. The angular measuring device in accordance with claim 1, wherein said coupler comprises an area which is axially spread into a gap of said stationary object.

15. The angular measuring device in accordance with claim 14, wherein said coupler comprises:
   a base that is fastened on said stator; and
   a plurality of tongues formed on said base that clamp said coupler to said stationary object.

16. The angular measuring device in accordance with claim 14, wherein said coupler comprises:
   two diametrically oppositely located tongues that are fastened to said stator; and
   two further diametrically oppositely located tongues, which are offset by 90° with respect to said two diametrically oppositely located tongues that are fastened to said stator, and wherein clamping takes place between said two further diametrically oppositely located tongues and said stationary object.

17. An angle measuring device for measuring an angular position of a stationary object with respect to an object which is rotatable around an axis of rotation, comprising:
   a rotor comprising a graduation, said rotor is connected to said rotatable object which rotates about an axis of rotation;
   a stator comprising a scanning unit for scanning said graduation, which rotates in relation to said scanning unit;
   a coupler fastened to said stationary object so as to seat said stator on said coupler that comprises a contact face which extends transversely with respect to said axis of rotation, wherein said stator comprises a contact face that extends transversely with respect to said axis of rotation and engages said contact face of said coupler so that a clamping force is generated by said contact face of said coupler so as to fasten said stator to said coupler and wherein said coupler is fixed against relative rotation, but is radially and/or axially elastic.

18. The angle measuring device of claim 17, wherein said clamping force is generated by axial displacement of said stator.

19. An angle measuring device for measuring an angular position of a stationary object with respect to an object which is rotatable around an axis of rotation, comprising:
   a rotor comprising a graduation, which is connected to said rotatable object, which rotates about an axis of rotation;
   a stator comprising a scanning unit for scanning said graduation, which moves in relation to said scanning unit;
   a coupler fastened to said stator so as to seat said stator on said stationary object that comprises a contact face which extends transversely with respect to said axis of rotation, wherein said coupler comprises a contact face that extends transversely with respect to said axis of rotation and engages said contact face of said stationary object so that a clamping force is generated so as to fasten said coupler to said stationary object and wherein said coupler is fixed against relative rotation, but is radially and/or axially elastic; and
   wherein said rotor is connected with said rotating object by an axially extending screw, and said clamping force takes place by axial displacement of said screw.

20. An angle measuring device for measuring an angular position of a stationary object with respect to an object which is rotatable around an axis of rotation, comprising:
   a rotor comprising a graduation, said rotor is connected to said rotatable object which rotates about an axis of rotation;
   a stator comprising a scanning unit for scanning said graduation, which moves in relation to said scanning unit;
   a coupler fastened to said stationary object so as to seat said stator on said coupler that comprises a contact face which extends transversely with respect to said axis of rotation, wherein said stator comprises a contact face that extends transversely with respect to said axis of rotation and engages said contact face of said coupler so that a clamping force is generated so as to fasten said stator to said coupler and wherein said coupler is fixed against relative rotation, but is radially and/or axially elastic; and wherein said rotor is connected with said rotating object by an axially extending screw, and said clamping force takes place by axial displacement of said screw.

21. A method for mounting a stator of an angle measuring device, comprising a rotor rotating around an axis of rotation, on a stationary object, said method comprising:

attaching a radially and/or axially compensating coupler to said stator of said angle measuring device;

axially moving said angle measuring device toward said stationary object, wherein a contact face, which extends transversely with respect to said axis of rotation about which a rotor rotates, of said coupler comes into contact with a contact face, which extends transversely with respect to said axis of rotation, of said stationary object;

supporting said contact face of said coupler on said contact face of said stationary object, wherein during said axially moving said angle measuring device toward said stationary object said contact face of said coupler is radially displaced until said contact face of said coupler is pushed against a further face of said stationary object and clamps said coupler in a manner fixed against relative rotation.

22. A method for mounting a stator of an angle measuring device, comprising a rotor rotating around an axis of rotation, on a stationary object, said method comprising:

attaching a radially and/or axially compensating coupler to said stator of said angle measuring device;

axially moving said angle measuring device toward said stationary object, wherein a contact face of said coupler comes into contact with a contact face of said stationary object so that a clamping engagement between said contact face of said coupler and said contact face of said stationary object results, wherein said contact face of said coupler extends transversely to said axis;

supporting said contact face of said coupler on said contact face of said stationary object, wherein by said axially moving said angle measuring device toward said stationary object said coupler is clamped to said stationary object in a manner fixed against relative rotation.

* * * * *

UNITED STATES PATENT AND TRADEMARK OFFICE
CERTIFICATE OF CORRECTION

PATENT NO. : 6,735,877 B2  Page 1 of 1
DATED : May 18, 2004
INVENTOR(S) : Alan Torr It is certified that error appears in the above-identified patent and that said Letters Patent is hereby corrected as shown below:

<u>Column 6,</u>
Line 43, before "The angular" delete "A".

Signed and Sealed this

Second Day of May, 2006

JON W. DUDAS
*Director of the United States Patent and Trademark Office*